United States Patent [19]
Strenglein et al.

[11] 3,777,261
[45] Dec. 4, 1973

[54] CALIBRATION APPARATUS AND METHOD FOR USE WITH SWEEP RATE TEST MEASUREMENT EQUIPMENT

[75] Inventors: Harry F. Strenglein, Clearwater; David E. Kent, Palm Harbor, both of Fla.

[73] Assignee: Sperry Rand Corporation, New York, N.Y.

[22] Filed: Aug. 27, 1971

[21] Appl. No.: 173,512

[52] U.S. Cl. ............................ 324/73 R, 324/130
[51] Int. Cl. ......................... G01r 15/12, G01r 1/02
[58] Field of Search ...................... 324/73 R, 158 R, 324/130; 235/151.31

[56] References Cited
UNITED STATES PATENTS
3,501,696   3/1970   Riley ............................... 324/130
3,651,315   3/1972   Collins ........................... 235/151.31
3,219,927   11/1965  Topp, Jr. et al. ................. 324/73 R

*Primary Examiner*—Rudolph V. Rolinec
*Assistant Examiner*—Ernest F. Karlsen
*Attorney*—S. C. Yeaton

[57] ABSTRACT

An apparatus used in conjunction with sweep rate test measurement equipment to normalize output data produced by the test equipment which includes a comparator that is responsive to correction data produced by the test equipment while the test equipment is coupled to a standard device having known parameters. A reference data signal is also applied to the comparator simultaneously with the correction data and the comparator produces difference signals representative of deviations in magnitude between the correction data and the reference data signals which are stored in shift registers at the sweep rate of the test equipment. The test equipment is subsequently coupled to prime equipment having unknown parameters for test measurement and the stored difference signals are combined with the test data from the prime equipment in a divider circuit which produces output test data that is normalized to the known parameters of the standard equipment.

16 Claims, 1 Drawing Figure

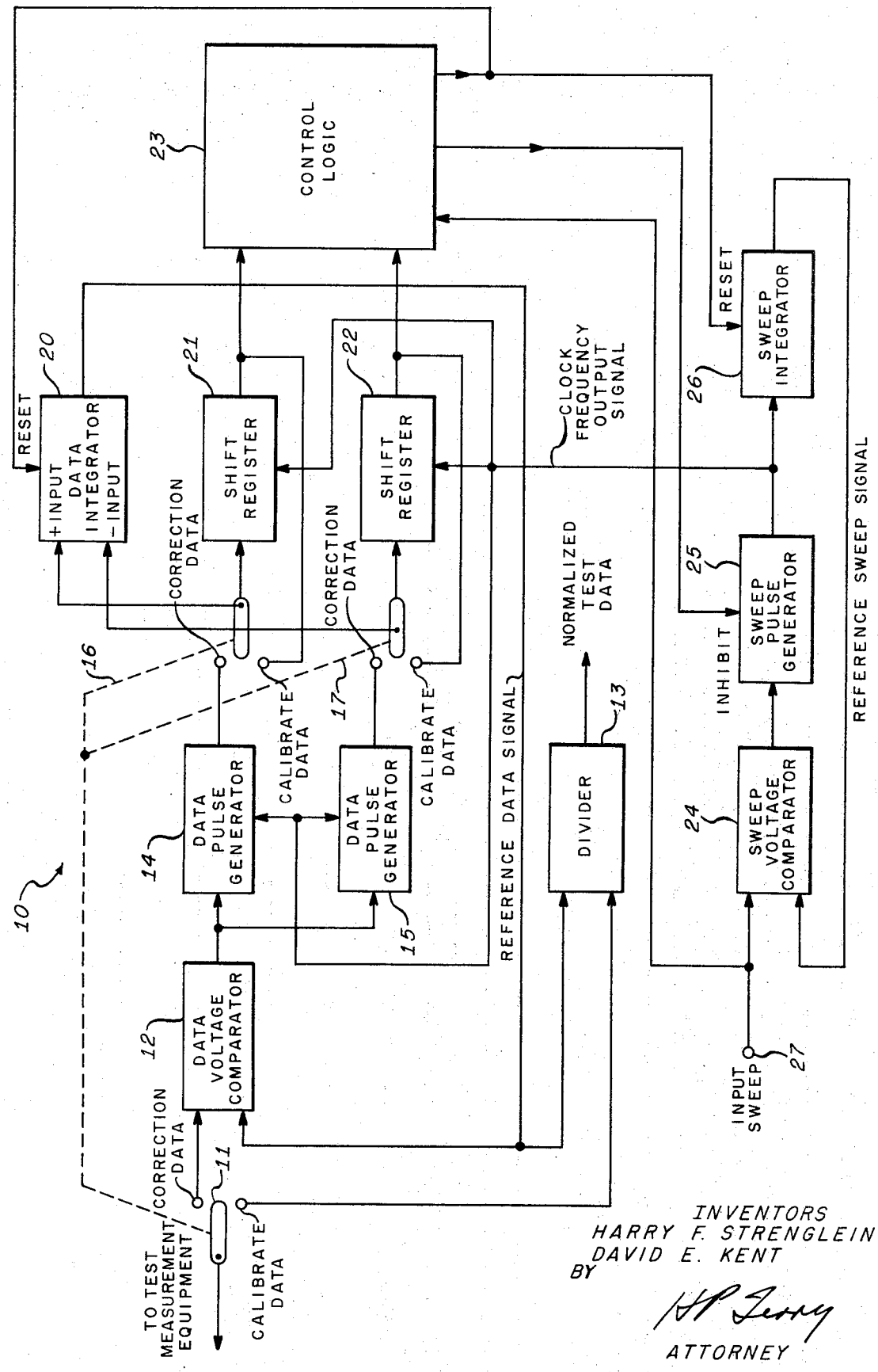

CALIBRATION APPARATUS AND METHOD FOR USE WITH SWEEP RATE TEST MEASUREMENT EQUIPMENT

BACKGROUND OF THE INVENTION

1. Field of the Invention

The subject invention pertains to the field of test measuring equipment and particularly to apparatus for use with sweep rate test equipment that provides a simple method of calibrating the test equipment.

2. Description of the Prior Art

In the prior art most test measurements are either swept measurements or a series of spot measurements. In swept measurements the accuracy is in general poorer than that obtainable with a series of spot measurements. Therefore, the convenience, speed, and other desirable qualities which are available in swept measurement are offset by the lower accuracy of the output test data. These results can be improved by making a swept measurement on a standard device having known parameters and recording the output data. The error between the recorded output data and the known parameters is also recorded and used to improve the accuracy of subsequent swept measurements on a piece of prime equipment having unknown parameters. Manually performing this operation destroys the convenience, speed, and between-point accuracy of the swept measurements.

Currently, two techniques are used to calibrate test measuring equipment. In the first a swept measurement is approximated by many spot measurements on a standard device and correction data is recorded as a discrete quantity for each point. Subsequent measurements on a prime equipment having unknown parameters are made at the same points and the output data produced at each point is combined with the recorded correction data as a separate computation at each point. As can be readily appreciated, this technique requires a very large number of data points if it is to approach the completeness of swept data. Incorporating computers into the test equipment enables the output test data to be produced at rates comparable to slow swept measurements but at a considerable increase in cost. Further, since this is a digital technique, the cost of interfacing the equipment required with existing laboratory equipment is prohibitive in many instances.

The second technique employs a tape loop upon which the correction data obtained from measuring a standard device is recorded. The correction data is then combined with the test data obtained from the prime equipment having unknown parameters, using analog devices. This technique has the advantage of providing continuous data at reasonably high sweep speeds, so that conventional real time oscilloscope displays are useful. If the accuracy and range of this technique are acceptable, it suffers only from the limitations accompanying the use of a tape recorder. Since a tape recorder is a mechanical device with a definite wearout pattern, it requires more maintenance than most all-electronic devices. Further, the frequency response of a tape recorder is sensitive to tape speeds. Therefore a change in sweep speeds is not easily implemented. And finally the synchronization of the sweep rates places some limitations on compatibility of the tape recorder with existing laboratory equipment.

The apparatus disclosed in the subject invention does not include mechanical parts; it can be slaved to either a sawtooth voltage input or to a pulse train input; it can operate at variable sweep rates with no adjustments or additional corrections and it can in some embodiments be stopped at any point and continue to apply the recorded correction to that point. Although conventional digital techniques have all of the foregoing advantages, the subject device interfaces readily with conventional swept signal sources and requires much less memory capacity to achieve the same number and resolution of correction data points.

SUMMARY OF THE INVENTION

The subject apparatus includes a data voltage comparator which is coupled through a switching device and test measurement equipment to a standard device having known parameters. It is also coupled to the output of a data integrator unit which provides a data reference signal representative of the known parameters of the standard device. The data comparator produces difference signals indicative of deviations in magnitude between the data reference signal and the output test data signal. The difference signals are processed through data pulse generators and applied to shift registers where they are stored at the sweep rate of the test measurement equipment. The difference signals are also applied to the input terminals of the data integrator.

The sweep rate from the test measurement equipment is applied to a sweep voltage comparator and to a control logic unit. The sweep comparator is coupled through a sweep pulse generator to a sweep integrator which provides a sweep reference signal to the sweep comparator. Upon initiation of the sweep input signal, the control logic unit provides an enable signal which allows the sweep generator to produce a clock signal at the sweep rate of the input sweep signal from the test equipment. This clock signal is applied to the shift registers and the data pulse generators. The sweep comparator, the sweep generator, and the sweep integrator circuits control the basic clock frequency for the subject device and maintain the rate at which correction data is stored in the shift registers compatible with the sweep rate of the test measurement equipment.

The control logic unit monitors the shift registers until an indication is received that the correction data has been loaded into the shift registers at which time further shifting is inhibited until the sweep control units have been reset.

The subject apparatus also includes a divider circuit which is coupled through the test measuring equipment to a prime equipment having unknown parameters to be measured. A second input to the divider circuit is connected to the output of the data integrator circuit which has its input terminals coupled to the output terminals of the shift registers to produce an output correction data signal derived from the stored signals in the shift registers. The sweep comparator, the sweep generator and the sweep integrator again provide a basic clock frequency for the shift registers that maintains the compatability of the sweep rate between the test measurement equipment and the calibration apparatus. The divider circuit combines the data reference signal and the test data signal produced by the test measurement equipment while testing the prime equipment having unknown parameters to provide output data that is normalized to the known parameters of the standard device.

The method used in first obtaining the data reference signal and subsequently applying this signal to the output test data provided by the test measurement equipment enables the calibration of the output test data with inexpensive circuit elements, a minimal decrease in accuracy and at sweep rates compatible with the sweep rate of the test measurement equipment.

BRIEF DESCRIPTION OF THE DRAWING

The drawing is a block diagram of the circuits which comprise the apparatus of the present invention used for calibrating sweep rate test measurement equipment.

DESCRIPTION OF THE PREFERRED EMBODIMENT

The calibration apparatus 10 as shown in the drawing includes a switch 11 having a correction data terminal and a calibrate data terminal. A data voltage comparator 12 has a first input terminal coupled to the correction data terminal on the switch 11 and a divider circuit 13 has a first input terminal coupled to the calibrate data terminal on the switch 11. Data pulse generators 14 and 15 have their input terminals coupled to the output terminal of the data voltage comparator 12. Switches 16 and 17 have correction data terminals which are coupled to the outputs of the data pulse generators 14 and 15 respectively. The wiper arm of the switches 16 and 17 are connected to a positive input terminal and a negative input terminal respectively on a data integrator 20 and are also connected to shift registers 21 and 22 respectively. The output terminal of the data integrator 20 is coupled to the second input terminals on both the data voltage comparator 12 and the divider circuit 13. The shift registers 21 and 22 have their output terminals connected to the calibrate data terminals on the switches 16 and 17 respectively and also have their output terminals coupled to a control logic unit 23.

As also shown in the FIGURE, the calibration unit 10 has an input sweep terminal 27 which is coupled to a first terminal on a sweep voltage comparator 24 and to the control logic unit 23. A sweep pulse generator 25 is coupled between the sweep voltage comparator 24 and a sweep integrator 26. The output of the sweep pulse generator 25 is a clock frequency signal which is applied to the shift registers 21 and 22 and also to the data pulse generators 14 and 15. The output of the sweep integrator 26 is coupled to a second input on the sweep voltage comparator 24.

The control logic unit 23 provides reset signals which are coupled to the data integrator 20 and the sweep integrator 26 and also provides an inhibit signal which is applied to the sweep pulse generator 25.

In operation the wiper arm of the switch 11 is connected to a test measurement equipment as indicated by the leader in the FIGURE which is coupled to a standard device having known parameters. The input sweep terminal 27 on the calibration apparatus 10 is coupled to the test measurement equipment and couples the sweep rate into the sweep voltage comparator 24 and the control logic unit 23. As the input sweep signal departs from zero volts the voltage level signal is coupled into the control logic unit 23 which removes an inhibit voltage level applied to the sweep pulse generator 25. The sweep voltage comparator 24 produces a difference voltage signal when the level of the applied sweep signal exceeds the value of the reference sweep signal from the sweep integrator 26. This difference signal initiates the generation of a pulse on the output of the sweep pulse generator 25. Each output pulse produces a reference sweep signal at the output of the sweep integrator 26 that is large enough to reverse the sweep voltage comparator 24. When the input sweep signal again exceeds the level of the reference sweep signal, the output of the sweep voltage comparator 24 will change and a new pulse will be triggered at the output of the sweep pulse generator 25. The pulses provided by the sweep pulse generator 25 comprise a clock frequency output signal which is applied to the data pulse generators 14 and 15 and the shift registers 21 and 22.

The wiper arm of the switch 11 is positioned to contact the correction data terminal when the test measurement equipment is coupled to the standard device having known parameters. The data signals provided by the test measurement equipment are supplied to the data voltage comparator 12 and produce an output difference signal when the level of the input data signal is different from the level of the reference data signal provided by the data integrator 20. If the input data signal is larger than the reference data signal, an output pulse will be provided at the output of the data pulse generator 14. Alternatively, if the data input is less than the reference data signal, the difference output signal from the data comparator 12 will produce an output pulse from the data pulse generator 15.

A maximum of one pulse is produced at the output of either the data pulse generator 14 or 15 for each clock pulse produced at the output of the sweep pulse generator 25. The output pulses produced by the data pulse generators 14 and 15 are coupled through the switches 16 and 17, which have their respective wiper arms positioned at the correction data terminals to the positive and negative input terminals respectively on the data integrator 20. In addition, the output pulses from the data generators 14 and 15 are coupled to the input terminals of the shift registers 21 and 22 respectively. These pulses are shifted down the shift register one position for each pulse applied to the shift registers 21 and 22 from the sweep pulse generator 25. The reference data signal is increased positively or negatively one increment at a time in response to the pulses applied through switches 16 and 17 to the positive and negative input terminal of the data integrator 20. This procedure is continued until the control logic unit 23 which monitors the output of the shift registers 21 and 22 receives an indication that the registers are fully loaded. At this time the control logic unit 23 reapplies the voltage level that provides an inhibit signal to the sweep pulse generator 25, thereby inhibiting the generation of the clock frequency output signal and any further shifting in the shift registers 21 and 22. Subsequently the control logic unit 23 provides a reset signal which is applied to the data integrator 20 and the sweep integrator 26. The calibration apparatus 10 is then in condition for normalizing output test data received from the prime equipment having unknown parameters.

The switches 11, 16 and 17 are placed in their calibrate data positions and the calibration apparatus 10 is coupled through switch 11 and the sweep rate test measurement equipment to the prime equipment having unknown parameters to be measured. The sweep from the test measurement equipment is applied to the input sweep terminal 27 of the calibration apparatus 10. Switches 16 and 17 couple the output terminals of the shift registers 21 and 22 to their input terminals and also to the positive and negative input terminals of the data integrator 20 respectively. The operation is similar to that described above in that when the sweep departs from zero volts, the control logic unit 23 removes the inhibit voltage applied to the sweep pulse generator 25 which produces the clock frequency output signal at the output terminal of the sweep pulse generator 25. The clock frequency output signal is applied to the shift registers 21 and 22 which cycle the stored correction data from their respective output terminals through switches 16 and 17 respectively to the positive and negative input terminals of the data integrator 20 and the input terminals of the shift registers 21 and 22. The data reference signal produced by the data integrator 20 is applied to one input terminal of the divider circuit 13.

The measured data from the prime equipment having unknown parameters is coupled through the sweep rate test measurement equipment and the switch 11 to a second input terminal on the divider network 13. Since the data integrator 20 is receiving precisely the same input data from the shift registers 21 and 22 as it did while the test measurement equipment was coupled to the standard device, the reference data output signal produced by the data integrator 20 is precisely the same as the reference data output signal applied to the data voltage comparator 12 when the switch 11 was in the correction data position. Therefore, the data applied to the divider circuit 13 from the test measurement equipment is normalized by the reference data signal output so that output test data signal produced by the divider circuit 13 is calibrated with respect to the known parameters of the standard device.

The calibration apparatus normalizes the output from the test measurement equipment as a function of the sweep rate. Therefore the correction can be applied to any point continuously by merely stopping the sweep rate at the desired point for the required period of time.

The data integrator 20 and the sweep integrator 26 may be comprised of up/down counters with digital to analog converter outputs which will enable the sweep to be stopped at any voltage and the data reference output signal may be applied indefinitely. However, the applications where stopping is not anticipated, capacitive type integrators may be used.

As shown in the preferred embodiment the calibrated output data is obtained by dividing the data produced by the data integrator 20 from the stored data in the shift registers 21 and 22. However, in other embodiments of the device the calibrated data could be produced for different measuring setups by employing a multiplier or adder circuit in place of the divider circuit 13. The selection of the particular circuit is a matter of design convenience and dictated by the particular measurement setup used with the calibration apparatus 10.

In order that the control logic unit 23 may detect that the shift registers 21 and 22 are loaded some method must be used to make the number of clock pulses generated by the sweep pulse generator 25 in response to the applied sweep rate at the input sweep terminal 27 equal the number of stages in the shift registers 21 and 22. One technique which may be employed is to place a logic "1" in both of the shift registers 21 and 22 at the start of the operation. This condition obviously cannot occur during normal operation. The logic unit 23 will then sense that the shift registers 21 and 22 are fully loaded when the initial condition appears at the output of the shift registers 21 and 22. Alternatively, counters could be provided that count the clock pulses out of the sweep pulse generator 25 and provide a stop signal at a count equal to the number of stages in the registers 21 and 22.

The block diagram shown is representative in that some logic components require multiple clock phases and some frunctions which are really logic "or" functions are shown as connected lines for simplicity. For example, the data reference output signal is shown applied to both the data voltage comparator 12 and the divider circuit 13 simultaneously whereas in actual practice a logic "or" function would be utilized. These details vary with the particular design variations and component choices and can be easily supplied by one familiar with the art.

While the invention has been described in its preferred embodiment, it is to be understood that the words which have been used are words of description rather than limitation and that changes may be made without departing from the true scope and spirit of the invention in its broader aspects.

We claim:

1. Calibration apparatus for use with sweep rate test equipment which provides corrections to test data obtained during measurement of prime equipment in accordance with stored data accumulated during calibration of said test equipment with a standard device comprising comparator means having a first input terminal responsive to signals produced by said sweep rate test equipment and a second input terminal responsive to reference data signals for producing difference output signals during calibration of said test equipment with said standard device, integrator means coupled to said comparator means for integrating said difference output signals and producing said reference data signals in accordance with said integrated difference output signals, storage means coupled to said comparator means for accumulating said difference output signals, control means responsive to said sweep rate of said test equipment for synchronizing the accumulation of said difference signals in said storage means to said sweep rate of said test equipment, combining means having a first input terminal coupled to said integrator means for receiving said reference data signals, and switching means for disconnecting said comparator means from said test equipment, coupling the output of said storage means to the input of said integrator means, and coupling said test equipment to a second input terminal on said combining means during measurement of said prime equipment whereby said combining means normalizes said test data received from said test equipment in accordance with said stored reference data signals.

2. Calibration apparatus for use with sweep rate test equipment as described in claim 1 in which said comparator means includes pulse generator means which produce a pulse output signal on a first terminal when said first test data signal is greater than said reference data signal and produce a pulse output signal on a second terminal when said first test data signal is less than said reference data signal.

3. Calibration apparatus for use with sweep rate test equipment as described in claim 2 in which said integrator means has a first input terminal coupled to said pulse generator means for receiving a pulse signal when said first test data signal is greater than said reference data signal and has a second input terminal coupled to said pulse generator means for receiving a pulse signal when said first test data signal is less than said reference data signal.

4. Calibration apparatus for use with sweep rate test equipment as described in claim 1 in which said integrator means includes up-down counter circuits coupled to digital-to-analog converter output circuits for providing a reference data signal that may be stopped indefinitely to provide a constant value of reference data signal.

5. Calibration apparatus for use with sweep rate test equipment as described in claim 1 in which said storage means includes a pair of parallel coupled shift registers.

6. Calibration apparatus for use with sweep rate test equipment as described in claim 1 in which said control means includes sweep comparator means having a first input terminal coupled to a sweep rate output terminal of said test equipment and a second input terminal responsive to a reference sweep signal for producing a sweep difference signal.

7. Calibration apparatus for use with sweep rate test equipment as described in claim 6 in which said control means further includes sweep pulse generator means responsive to said sweep difference signal for producing a clock frequency signal when said sweep rate signal exceeds said reference sweep signal.

8. Calibration apparatus for use with sweep rate test equipment as described in claim 7 in which said control means further includes feedback means responsive to said clock frequency signal for producing said reference sweep signal.

9. Calibration apparatus for use with sweep rate test equipment as described in claim 7 in which said control means includes logic circuit means which produce an inhibit signal for application to said sweep pulse generator means in response to a specific signal from said storage means.

10. Calibration apparatus for use with sweep rate test equipment as described in claim 1 in which said combining means includes a divider circuit which normalizes said second test data signals from said test equipment by dividing said second test data signals by said reference data signals at the sweep rate of said test equipment.

11. Calibration apparatus for use with sweep rate test equipment as described in claim 1 in which said combining means includes an adder circuit for normalizing said second test data signals from said test equipment by adding said reference data signals to said second test data signals.

12. Calibration apparatus for use with sweep rate test equipment as described in claim 1 in which said combining means includes multiplier circuit means for normalizing said second test data signals from said test equipment by multiplying said second test data signals by said reference data signals.

13. A method for normalizing test data produced by sweep rate test equipment which includes the steps of
coupling said sweep rate test equipment to a standard device having known parameters,
comparing said test data produced by said test equipment while coupled to said standard device to an initial reference data signal representative of the magnitude of said known parameter in a comparator means to produce an output difference signal,
integrating said output difference signal to produce a reference data signal representative of the total deviation in magnitude of said test data signal from said initial reference data signal,
continuously feeding back said reference data signal to said comparator means for comparison with said test data input signals,
accumulating said difference signals in a storage means at the sweep rate of said sweep rate of said test equipment,
coupling said sweep rate test data equipment to an equipment having unknown parameters,
integrating the stored difference signals in the same order in which they were accumulated, and
combining the integrated accumulated difference signals with the test data produced by the test equipment when coupled to an equipment having unknown parameters to produce output test data signals normalized to said unknown parameters of said standard device.

14. The method for normalizing test data produced by sweep rate test equipment as described in claim 13 which further includes the steps of
comparing the sweep rate of the test equipment with an initial reference sweep signal in a comparator means to produce a sweep difference signal,
generating an output pulse each time the difference signal exceeds a preset threshold,
integrating said output pulse to produce a reference sweep data signal, and
feeding back said reference sweep data signal to said sweep comparator means for comparison with said sweep rate of said test equipment.

15. The method for normalizing test data produced by sweep rate test equipment as described in claim 13 which also includes the step of
producing an output signal from said storage means when said storage means is fully loaded, and
applying an inhibit signal to said pulse generator means which stops the generation of said pulse output signals thereby inhibiting continuous operation.

16. The method for normalizing test data produced by sweep rate test equipment as described in claim 13 which includes the steps of
inhibiting the generation of sweep output pulses at any specific time, and
continuously producing a constant value of integrated accumulated difference signals to be combined with said test data signals.

* * * * *